Nov. 3, 1942. K. RIESS ET AL 2,300,970
APPARATUS FOR PRINTING SUBTRACTIVE MULTICOLOR IMAGES
Filed March 6, 1941 4 Sheets-Sheet 1

Kurt Riess
Karl van Briessen
Fritz Kreckeler
INVENTORS

BY
THEIR ATTORNEYS

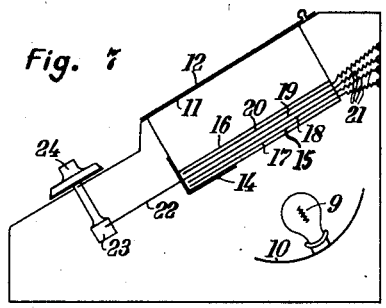
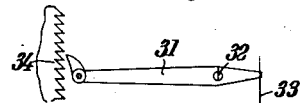
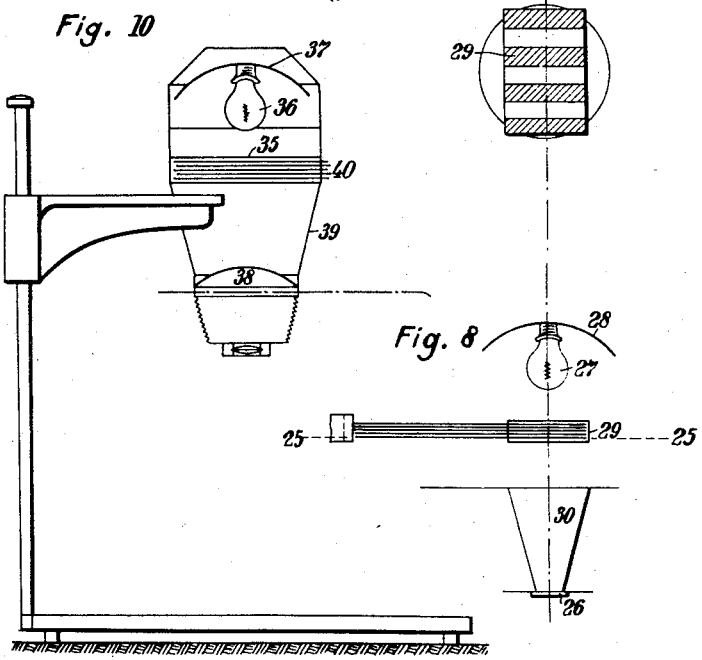

Kurt Riess
Karl van Briessen
Fritz Kreckeler
INVENTORS

Nov. 3, 1942.   K. RIESS ET AL   2,300,970
APPARATUS FOR PRINTING SUBTRACTIVE MULTICOLOR IMAGES
Filed March 6, 1941   4 Sheets-Sheet 4

Kurt Riess
Karl van Briessen
Fritz Kreckeler
INVENTORS

BY

THEIR ATTORNEYS

Patented Nov. 3, 1942

2,300,970

UNITED STATES PATENT OFFICE 2,300,970

APPARATUS FOR PRINTING SUBTRACTIVE MULTICOLOR IMAGES

Kurt Riess, Wolfen, Kreis Bitterfeld, Karl van Briessen, Leipzig, and Fritz Kreckeler, Bitterfeld, Germany, assignors to General Aniline & Film Corporation, New York, N. Y., a corporation of Delaware Application March 6, 1941, Serial No. 382,024
In Germany February 28, 1940

4 Claims. (Cl. 88—24)

This invention relates to an improved apparatus for the printing of subtractive multi-color images.

It is known to employ filters colored in the primary colors for the printing of subtractive multi-color images and to alter thereby not only the intensity but also the composition of the light. Furthermore it was proposed to use dyestuffs for the printing filters which correspond to the dyestuffs of the original with regard to their optical properties.

It is one object of this invention to provide an apparatus for printing subtractive multi-color images in which the spectral composition and the intensity of the printing light are controlled.

Other objects will become apparent from the following description.

Reference is made to the accompanying drawings in which modifications of the apparatus according to the invention are illustrated.

Figure 11:
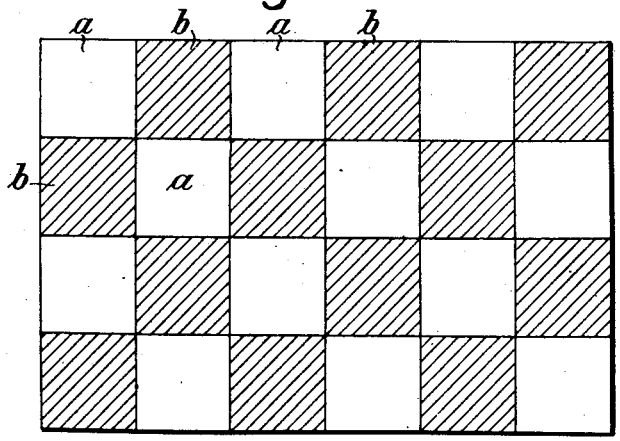
Figure 12:
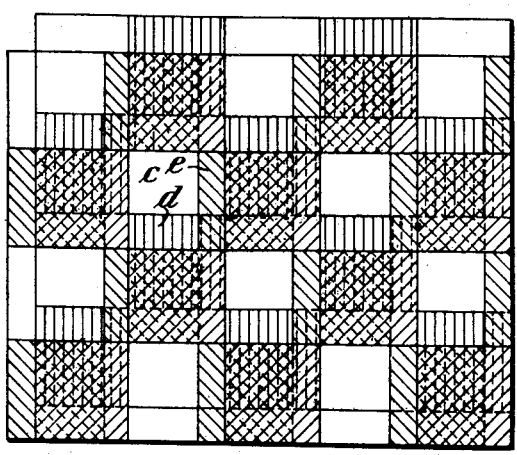
Figure 13:
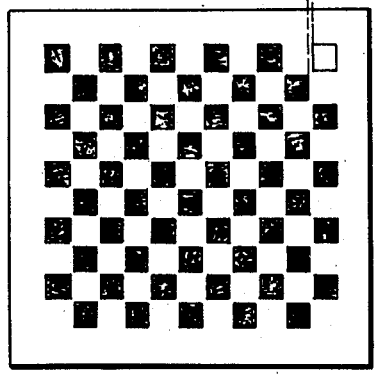
Figure 14:
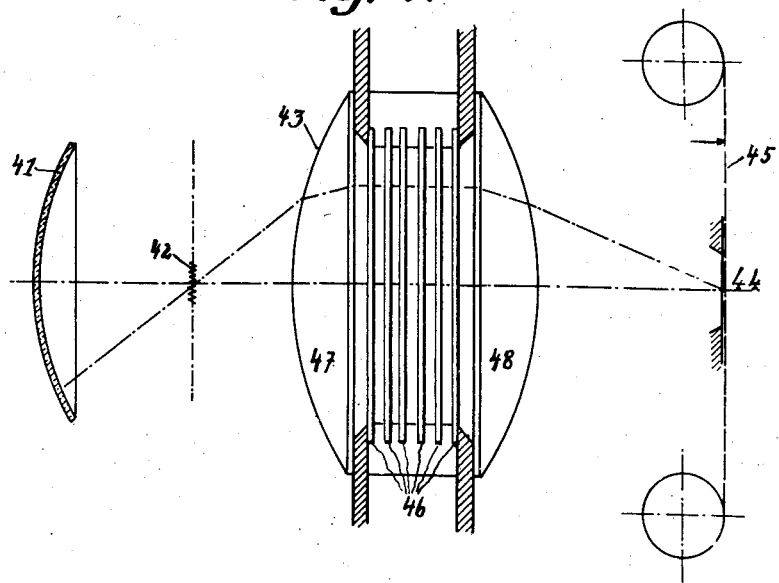

Figure 7 shows an arrangement of a set of filters and diaphragms in a printing apparatus, Figure 8 shows an arrangement of a set of filters and diaphragms in a copying machine for cinema-films, Figure 9 shows a section on line 25—25 of Figure 8, Figure 10 shows an arrangement of a set of filters and diaphragms in an enlarging apparatus, Figures 11 and 12 show modifications of filters and diaphragms, Figure 13 shows a lattice diaphragm, and Figure 14 shows an arrangement of filters and diaphragms within a condenser.

It has been found that the control of the intensity and the spectral composition of the printing light is attained in such a way that single filters preferably in the additive and subtractive primary colors, constructed as screens or as sectors, are arranged between fixed lattice (grid) diaphragms also built in a screen-like fashion in such a way, that the filter zones are completely covered in zero-position by the light-impermeable parts of the fixed diaphragms and are movable simultaneously or successively towards one another for the control of the light. The single filter zones are thereby arranged behind one another according to the desired coloring or intensity of the printing light within the light-permeable zones of the rigid diaphragms.

In the practice of this invention different constructions are possible.

Figure 1:
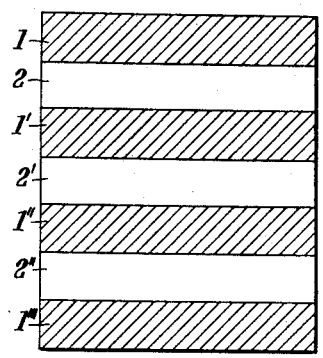
Figure 1 shows a screen-like filter.

In Figure 1, which shows a screen-like filter, the filter stripes are marked $1, 1', 1'', 1'''$, whereas the stripes $2, 2', 2''$ represent colorless zones. The diaphragms are built in the same way. The stripes $1, 1', 1'', 1'''$, however, are in this case light-impermeable.

Figures 2, 3, 4:
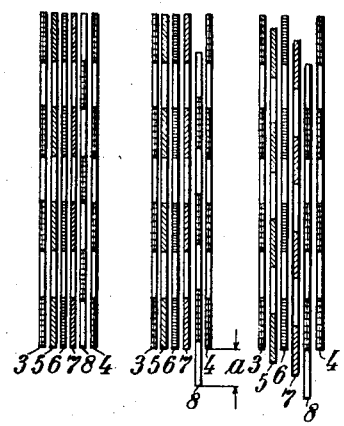
Figures 2–5 show cross sectional views of sets of filters and diaphragms.

In Figure 2 all filters are in zero-position. Numerals 3 and 4 represent the two fixed diaphragms, 5, 6 and 7 three screen-like filters and 8, a movable diaphragm. It is advisable to arrange the filters and the diaphragm 8 in such a manner as to permit them to be shifted in a transverse direction to the stripes as much as the width of one filter stripe. The movable diaphragm 8 represents a negative of the rigid diaphragms so that in normal position the light-impermeable zones of the movable diaphragm lie at the same height as the light-permeable zones of the fixed diaphragm and vice versa.

In Figure 3, a position of a set of diaphragms and filters is represented, the light being dosed only according to the intensity without changing its color. The colored filters 5, 6 and 7 are in zero-position, i. e. the colored stripes $1, 1', 1'', 1'''$ of the filters 5, 6, and 7 lie behind the diaphragm stripes $1, 1', 1'', 1'''$ of the rigid diaphragms 3 and 4.

The movable diaphragm 8 has been shifted to the extent $a$ from the zero-position. For the penetrating light therefore the space $f = a, b, n$ is open, if $b$ signifies the length of the stripes and $n$ the number of light-impermeable stripes of the movable diaphragm.

If a certain spectral region is preferred, the filters are shifted as described in Figure 4. If the colors of the filters, for instance, are chosen according to the subtractive primary colors, by shifting to and fro one or two filters, different spectral compositions of the light may be obtained which changes, however, the relative total light intensity. If the three filters are moved from the zero-position, the open space resulting from the filter which has been moved the shortest distance effects only a reduction of the intensity of light—the subtractive colors together give neutral grey—whereas for the coloring of the light the two filters shifted further on are of importance. This fact may be used for the control of the intensity.

Figure 5:
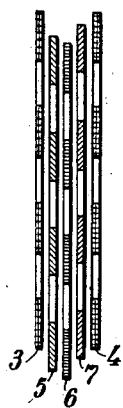

In Figure 5 there are arranged only three filters 5, 6 and 7 between the fixed diaphragms 3 and 4. The intensity control is effected by the shifting of these three filters.

If the filters are chosen according to the additive primary colors—arranged behind one another they form black—this method of intensity control is still more effective. As it is convenient in certain cases to vary the coloring without changing the effective total light intensity, the hitherto clear stripes on the filters can be kept in neutral grey color the transparency of these zones being adjusted in such a way that the transparency for the total light intensity is not changed when shifting the filters.

Figure 6:
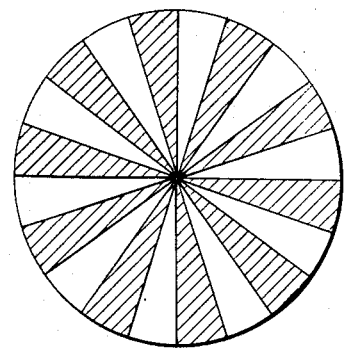
Figure 6 shows a further embodiment of the filters.

In Figure 6, the filters and diaphragms are formed in the shape of sectors and arranged in such a way that in zero-position the filter sectors lie behind the diaphragm sectors. The change of intensity and coloring is attained here by turning the movable filters or the diaphragm disc.

The construction of the filters and diaphragms according to the present invention has, besides the possibility of attaining every possible spectral composition of the light with three filters, the advantage that only slight shiftings of the filters—maximum value up to the chosen width of the stripes—are necessary. Since the number of stripes for a certain filter size increases with decreasing width of the stripes, a homogenizing effect of the color of the light is easily attained herewith. Needless to say that the filters cannot be used in a parallel light beam, as then an uneven illumination results. Furthermore existing optical means should not be arranged in such a manner that an image of the filter is obtained in the plane of the exposure. It is preferable to insert light-scattering means, for instance, ground glasses, between the filter and the plane of the exposure. Advantageously the outside of the fixed diaphragm disc which turns towards the plane of the exposure is provided with a dull surface.

In Figure 7, which shows the arrangement of the filters and diaphragms in a copying apparatus, the source of light 9 with the reflector 10 illuminates the space of the largest possible picture in the plane of the exposure 11. The original and printing material are kept level and in contact in the plane 11 by the cover 12. Between the source of light 9 and plane 11 the set 14 of the filters and diaphragms is arranged. 15 and 16 designate the fixed diaphragms, 17, 18 and 19 the movable filters and 20 the movable diaphragm. The springs 21 hold the movable parts normally in zero-position. By means of the four strings 22, which on one hand are fastened to each one of the filters or the movable diaphragm and on the other hand to one of the four rotative shafts 23, the filters or the diaphragm may be shifted by turning the scale button connected with shaft 23. The scale shows the extent of shifting.

Figures 8 and 9 show the filter- and diaphragm-set arranged in a copying machine for cinema-films.

In Figure 8, a set of filters and diaphragms 29 is again arranged between the printing plane 26 and source of light 27 with reflector 28. There is provided as light-scattering means a further ground glass 30. The movement of the filters and diaphragm is accomplished by the levers 31 shown in Figure 9 which are rotatable on the axle 32 and are connected by the rods 33 with the single plates of the filter- and diaphragm-set 29.

The movement of the levers 31 may be accomplished with the aid of device 34.

When printing a cinematographic film, the slight movement of the filters is of great advantage, as here in a relatively short time, during the dark interval of two pictures, the new adjustment of the filter- and diaphragm-set may be carried out.

In Figure 10 the filter- and diaphragm-set is arranged in an enlarging apparatus. The construction of Figure 6 is used herein. The filter- and diaphragm-set 35 is arranged here between the source of light 36 with reflector 37 and the lens 38. With the aid of the levers 40 projecting from the chamber 39 and connected with the rotatable filters the color and the intensity may be controlled, if necessary, according to a scale.

In the construction of the filters shown in Figures 1–4 a change of the spectral composition of the light is always connected with a change of the total light intensity by shifting the diaphragm 8, as the diaphragm holds back a certain amount either of the filtered or of the unfiltered light. If this change is to be avoided, the construction of the filters and the direction of their movements must be selected in such a way that not only the filtered but also the unfiltered light is partly weakened by the diaphragm whereby nothing is changed in the spectral composition.

Figure 11 shows a construction according to the above mentioned principle. The filters and diaphragms are built like a chess-board. $a$ designates colorless openings, $b$ light-impermeable zones of the diaphragm or colored light-permeable zones of the filters.

The filter plates are movable in one direction, whereas the diaphragm is moved perpendicularly to it. By these means the adjustment as shown in Figure 12 is possible. In this figure the zone $c$ is partly covered by the filter zone $d$. A certain portion of both of these zones is covered up by the diaphragm $e$ inserted from the side so that the proportion of filter zone to clear zone remains always constant.

Similar constructions may also be used for the optical printing of films.

It is convenient to position concave mirror and condenser in the path of light so as to use the total intensity of the source of light. If the elements are arranged in the following succession: film gate, elements for controlling light, condenser, source of light and concave mirror, it is observed that images of the lattice diaphragms are obtained in the film gate. Ground glasses or opal plates may be inserted between the film gate and the controlling elements to overcome this disadvantage. These glasses, however, are capable of absorbing the light to the extent of 50%.

These difficulties can be avoided by positioning the filters and diaphragms within the condenser. A considerable increase of the intensity of light is attained by this arrangement.

Moreover it is to be preferred to construct the lattice diaphragms as metallic diaphragms the zones of which are connected with one another by lists. By these means losses which are due to reflection and absorption are chiefly avoided which are produced by reflection and absorption. Above 60% of all the rays of heat are reflected by the metal diaphragm. This is especially important because on too strongly heating the color of the filters is changed and hence the filters become useless.

Figure 13 shows a metallic lattice diaphragm.

The zones of the diaphragm are connected with one another by lists 49. The arrangement of the diaphragms and filters is shown in Figure 14.

In Figure 14, numeral 41 designates the concave mirror which projects the light of the lamp 42 through the condenser 43 onto the film gate 44 past which the film 45 is fed. The filters and diaphragms 46 are placed in the condenser 43 between the lenses 47 and 48.

We claim:

1. In an apparatus for printing subtractive multi-color images in which a concave mirror reflects the light of a source of light and projects it through the condenser consisting of at least two lenses onto the film gate, an improvement of the control of the intensity and the spectral composition of the printing light which comprises a set of at least one diaphragm and a plurality of filters, said diaphragm having alternate opaque and transparent sections, said filters having corresponding alternate colorless transparent and colored transparent sections, each of said filters in a different one of the primary colors, said filters being arranged between fixed diaphragms which are likewise constructed screen-like in such a manner that the colored filter sections in zero-position are completely covered by the light impermeable parts of said fixed diaphragms, said diaphragms and filters being arranged between the lenses of said condenser, the first-named diaphragm and said filters being capable of being shifted relative to one another.

2. In an apparatus for printing subtractive multi-color images in which a concave mirror reflects the light of a source of light and projects it through the condenser consisting of at least two lenses onto the film gate, an improvement of the control of the intensity and the spectral composition of the printing light which comprises a set of at least one diaphragm and a plurality of filters, said diaphragm having alternate opaque and transparent sections, said filters having corresponding alternate colorless transparent and colored transparent sections, each of said filters in a different one of the primary colors, said filters being arranged between fixed metallic lattice diaphragms which are likewise constructed screen-like and the sections of which are connected with one another by lists in such a manner that the colored filter sections in zero-position are completely covered by the light-impermeable parts of said fixed diaphragms, said diaphragms and filters being arranged between the lenses of said condenser, the first-named diaphragm and said filters being capable of being shifted relative to one another.

3. In an apparatus for printing subtractive multi-color images in which a concave mirror reflects the light of a source of light and projects it through the condenser consisting of at least two lenses onto the film gate, an improvement of the control of the intensity and the spectral composition of the printing light which comprises a set of diaphragms and filters arranged between the two lenses of said condenser and comprising two fixed diaphragms having alternate opaque and transparent sections and between said fixed diaphragms at least one adjustable diaphragm likewise having alternate opaque and transparent sections and a plurality of filters having corresponding alternate colorless transparent sections and colored transparent sections, each of said filters in a different one of the primary colors, said filters and said adjustable diaphragm being capable of being shifted parallel to one another and said fixed diaphragms, said colored filter sections in zero-position being completely covered by said opaque sections of the fixed diaphragms.

4. In an apparatus for printing subtractive multi-color images in which a concave mirror reflects the light of a source of light and projects it through the condenser consisting of at least two lenses onto the film gate, an improvement of the control of the intensity and the spectral composition of the printing light which comprises a set of metallic lattice diaphragms and filters arranged between the two lenses of said condenser and comprising two fixed diaphragms having alternate opaque and transparent sections and between said fixed diaphragms at least one adjustable diaphragm likewise having alternate opaque and transparent sections and a plurality of filters having corresponding alternate colorless transparent sections and colored transparent sections, each of said filters in a different one of the primary colors, said filters and said adjustable diaphragm being capable of being shifted parallel to one another and said fixed diaphragms, said colored filter sections in zero-position being completely covered by said opaque sections of the fixed diaphragms, the sections of said diaphragms being connected with one another by lists.

KURT RIESS.
KARL VAN BRIESSEN.
FRITZ KRECKELER.